United States Patent Office 3,410,495
Patented Nov. 12, 1968

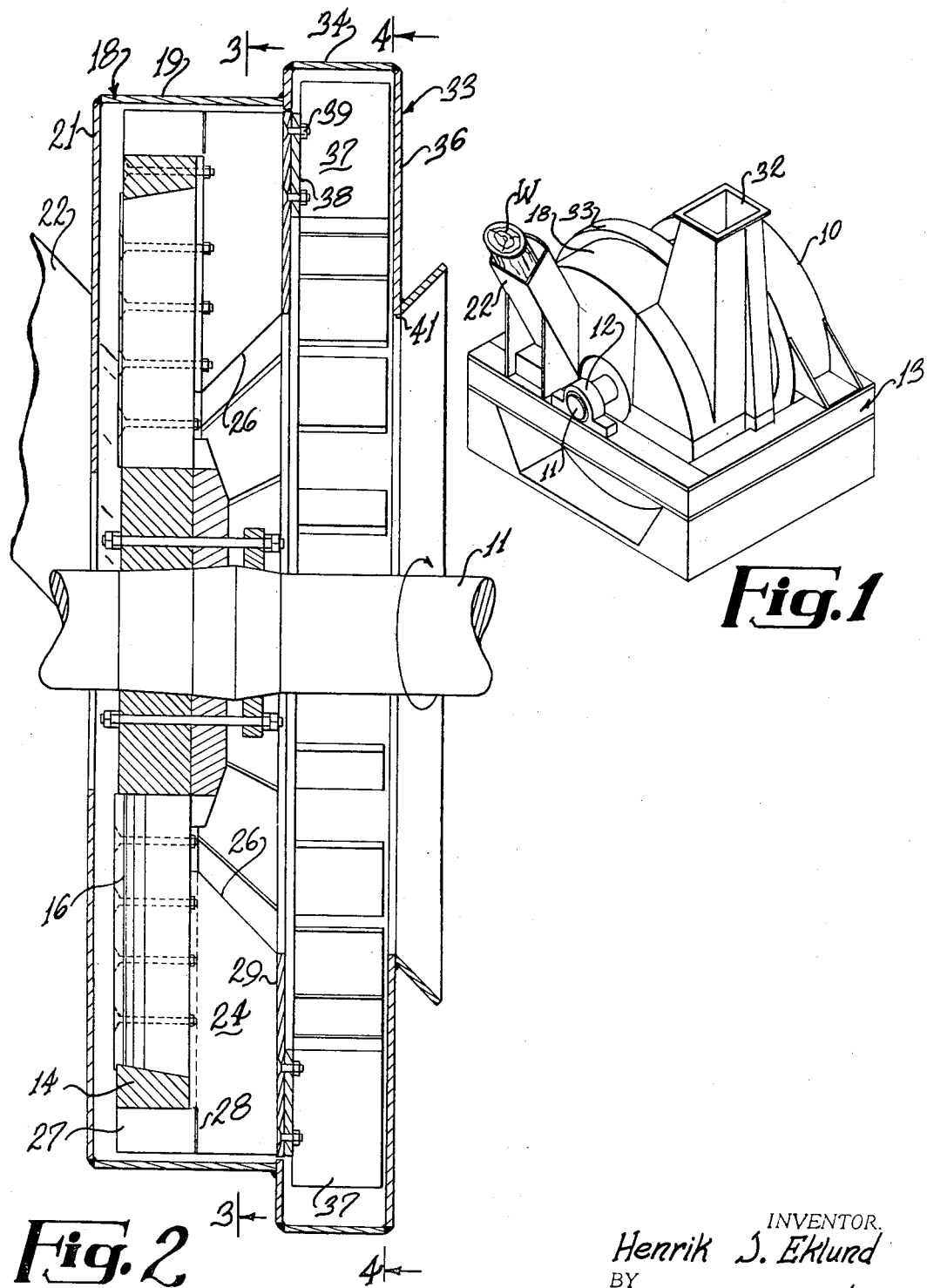

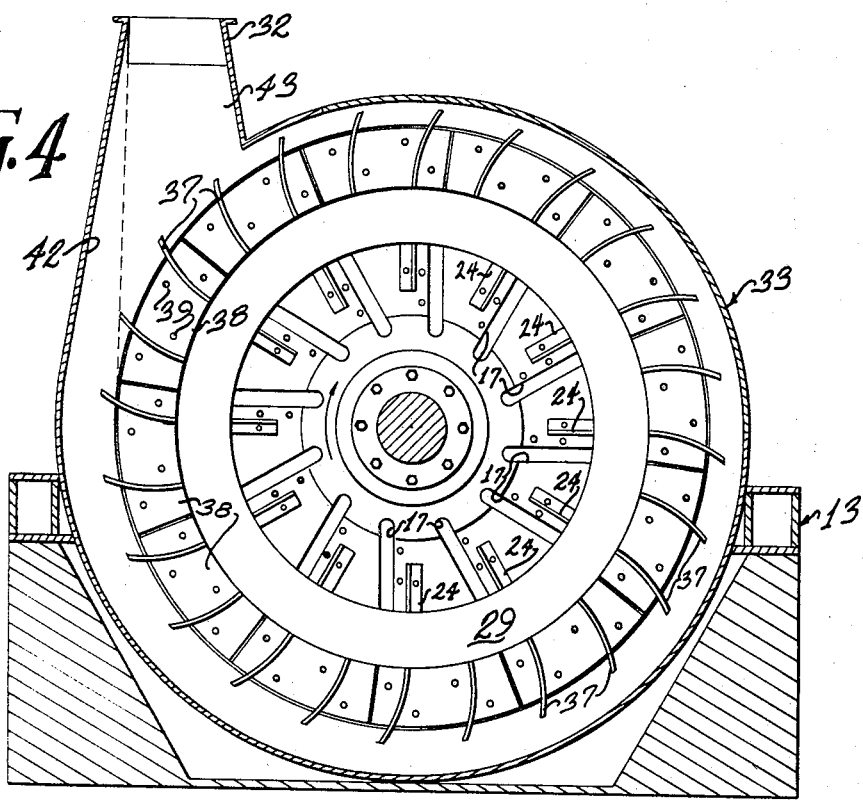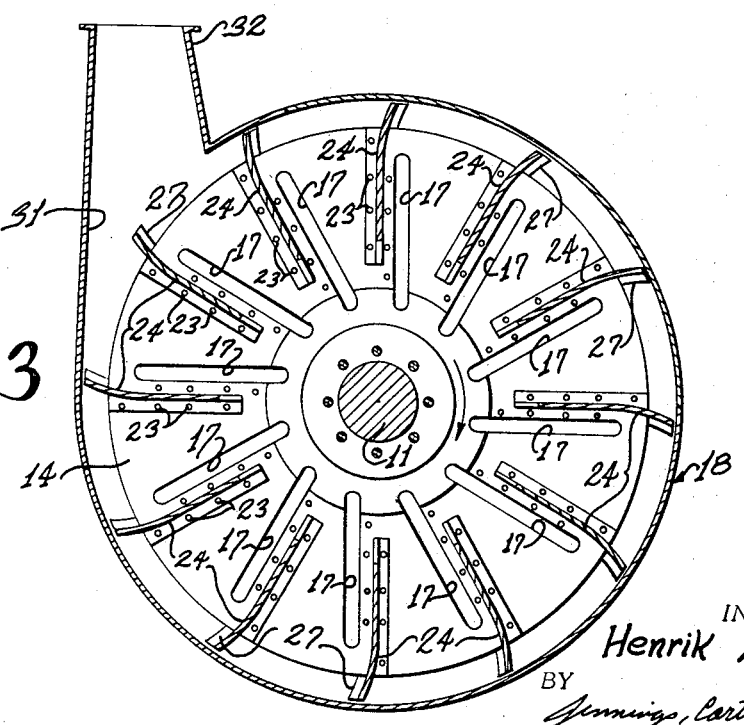

3,410,495
WOOD CHIPPER
Henrik J. Eklund, Pittsfield, Mass., assignor to Beloit Corporation, a corporation of Wisconsin
Continuation-in-part of application Ser. No. 318,865, Oct. 25, 1963. This application July 22, 1966, Ser. No. 567,218
3 Claims. (Cl. 251—278)

This invention relates to a wood chipper and is a continuation-in-part application of my copending application Ser. No. 318,865, filed Oct. 25, 1963 and entitled Wood Chipper now Patent No. 3,276,700.

An object of my invention is to provide a wood chipper in which the chips are removed continuously from the chipper as they are cut by a combination of forces consisting of the kinetic energy possessed by the moving chips in a chip receiving chamber and the blowing action of a moving stream of air adjacent the chips within the chip receiving chamber, and the blowing action of an involute blower.

A more specific object of my invention is to provide a wood chipper of the character designated in which the chip receiving chamber and the involute blower are mounted at the same side of a rotary disc having angularly spaced knives and angularly spaced passageways therethrough, whereby the involute blower does not interfere in any way with the introduction of wood into the apparatus.

A further object of my invention is to provide a wood chipper of the character designated in which an effective blower is provided without the chips entering the space between the blowing means and the housing therefor and at the same time the chips are discharged as fast as they are brought into the apparatus, thereby eliminating carry-over of the chips.

Briefly, my improved wood chipper comrpises a circular housing surrounding the discharge side of the disc which carries cutting blades. Angularly space blades are carried by the disc in position to rotate within the circular housing and an annular plate is mounted for rotation with the disc at the opposite sides of the blades which rotate within the circular housing from the sides thereof nearest the disc. An involute housing surrounds the opposite side of the annular plate from the side thereof nearest the disc and angularly spaced blades are carried by the annular plate in position to rotate within the involute housing to circulate air therethrough. A tangential outlet is providd for the circular housing for discharging chips and a circumferential outlet is provided for the involute housing adjacent and alongside the tangential outlet for discharging air. A discharge conduit communicates with the tangential outlet and the circumferential outlet for discharging air. A discharge conduit communiential outlet aids in conveying the chips through the discharge conduit.

Apparatus embodying features of my invention is illustrated in the accompanying drawings, forming a part of this application, in which:

FIG. 1 is a perspective view of the wood chipper;
FIG. 2 is a vertical sectional view through the chipper;
FIG. 3 is a sectional view taken generally along the line 3—3 of FIG. 2 and drawn to a smaller scale; and,
FIG. 4 is a sectional view taken generally along the line 4—4 of FIG. 2 and drawn to a smaller scale.

Referring now to the drawings for a better understanding of my invention, I show a power unit 10, such as an electric motor, having a drive shaft 11. Opposite ends of the drive shaft 11 are supported in suitable bearings 12, only one of which is shown. The bearing members 12 are supported by a supporting frame 13.

Mounted on the shaft 11 and adapted for rotation therewith is a rotary disc 14 having a plurality of angularly spaced knives 16 mounted at one side thereof, as shown in FIG. 2. A plurality of angularly spaced through passageways 17 are provided adjacent the knives 16 whereby the wood cut into chips by these knives passes through the passageway 17 to the opposite side of the disc 14 carrying the blade 16 by a chute 22 whereupon it is cut into chips by the knives.

Secured to the rotary disc 14 by suitable retaining bolts 23 are a plurality of angularly spaced, radially extending blades 24. The inner end of each blade 24 is spaced from the shaft 11, as clearly shown in FIGS. 2 and 3, also the inner edges of the blades 24 extend outwardly and rearwardly as at 26. The outer end of each blade 24 is provided with a forwardly extending portion 27 which is bent as at 28 to direct the chips toward the discharge side of the blades 24.

An annular plate 29 is secured rigidly to the discharge sides of the blades 24 or at the opposite sides of the blades 24 from the sides thereof nearest the disc 14. The annular plate 29 thus rotates with the disc 14 and provides a rear wall for the circular housing 18. As shown in FIGS. 2 and 3, the blades 24 are adapted to rotate within the circular housing 18 with a relatively close fit whereby chips are conveyed therethrough without entering the small space between the housing 18 and the blades 24. As shown in FIG. 3, the circular housing 18 is provided with a tangential outlet 31 which communicates with a discharge conduit 32.

Secured to the circular housing 18 and surrounding the opposite side of the annular plate 29 from the side thereof nearest the disc 14 is an involute housing 33 having an outer wall 34 and a rear wall 36. As shown in FIG. 2, the annular plate 29 defines a front wall for the involute housing 34. Angularly spaced, radially extending blades 37 are carried by the annular plate 29 in position to rotate within the involute housing 33 to circulate air therethrough. Preferably, the blades 37 are secured to arcuate sections 38 which in turn are secured rigidly to the annular plate 29 by suitable retaining bolts 39. As shown in FIG. 2, the rear wall 36 of the involute housing 33 is provided with a centrally disposed inlet opening 41 which surrounds the drive shaft 11 whereby air is drawn inwardly of the involute housing 33. As shown in FIG. 4, the involute housing 33 is provided with a circumferential outlet 42 which communicates with the discharge conduit 32. By providing an involute housing 33, the blades 37 move progressively away from the inner surface of the housing as they approach the circumferential outlet 42 whereby a very efficient blower is provided.

From the foregoing description, the operation of my improved wood chipper will be readily understood. The wood W is fed into the chute 22 whereupon it is cut into chips by the knives 16. The chips pass through the openings 17 into the circular housing 18. Due to centrifugal force, the chips move outwardly and rearwardly whereby all of the chips move outwardly of the inner edge of the annular plate 29. The chips are thus confined within the circular housing 18 and are conveyed therethrough by the kinetic energy possessed by the moving chips and the blowing action of the moving stream of air adjacent the chips within the housing 18.

Air is drawn inwardly of the involute housing 33 through inlet 41. As the chips are discharged from the tangential outlet 31, they are engaged by the air which is discharged through the circumferential outlet 42 whereby this air aids in conveying the chips through the discharge condiut 32. It will be noted that the circumferential outlet 42 is separated from the tangential outlet 31 by a partition wall 43 whereby air discharged through the circumferential outlet does not engage the chips until they are introduced into the discharge conduit 32.

From the foregoing, it will be seen that I have devised an improved wood chipper wherein the chip receiving and conveying housing is mounted at the same side of the rotary disc as the involute housing, thus providing a compact structure which does not interfere in any way with the feed of wood to the apparatus. By providing an involute blower housing, I not only provide an effective blower which aids in conveying the chips but also make it possible to position the chip conveying blades closely adjacent the inner surface of the circular housing, thereby eliminating passage of the chips between the conveying blades and the housing therefor.

While I have shown my invention in but one form, it will be obvious to those skilled in the art that it is not so limited, but is susceptible of various other changes and modifications without departing from the spirit thereof, and I, desire, therefore, that only such limitations shall be placed thereupon as are specifically set forth in the appended claims.

I claim:
1. A wood chipper embodying a rotary disc having angularly spaced knives and angularly spaced passageways therethrough together with means to feed wood to one side of the disc whereby the wood is cut into chips which pass through the passageways to the other side of the disc;
    (a) a circular housing surrounding said other side of the disc,
    (b) angularly spaced blades carried by said other side of the disc and disposed to rotate within said circular housing with a relatively close fit to convey chips therethrough,
    (c) an annular plate mounted for rotation with said disc at the opposite sides of said blades which rotate within said circular housing from the sides thereof nearest said disc,
    (d) an involute housing surrounding the opposite side of said annular plate from the side thereof nearest said disc,
    (e) other angularly spaced blades carried by said annular plate and disposed to rotate within said involute housing to circulate air therethrough,
    (f) a tangential outlet for said circular housing for discharging chips therefrom,
    (g) a circumferential outlet for said involute housing adjacent and alongside said tangential outlet for discharging air therefrom, and
    (h) a discharge conduit communicating with said tangential outlet and said circumferential outlet to receive chips discharged through said tangential outlet and air discharged through said circumferential outlet whereby the air discharged through said circumferential outlet aids in conveying the chips through said discharge conduit.

2. A wood chipper as defined in claim 1 in which the angularly spaced blades mounted for rotation within said circular housing are secured to one side of said annular plate and the angularly spaced blades mounted for rotation within said involute housing are secured to the other side of said annular plate.

3. A wood chipper as defined in claim 1 in which a centrally disposed opening is provided in said involute housing for introduicng air into said involute housing.

References Cited

UNITED STATES PATENTS

| | | | |
|---|---|---|---|
| 2,361,278 | 10/1944 | Evans | 241—56 |
| 3,123,311 | 3/1964 | Fontaine | 241—278 X |
| 3,276,700 | 10/1966 | Eklund | 241—55 |
| 3,332,461 | 7/1967 | Ledergerber | 241—278 X |

HARRISON L. HINSON, *Primary Examiner.*